(12) United States Patent
Nair et al.

(10) Patent No.: US 11,956,627 B2
(45) Date of Patent: Apr. 9, 2024

(54) SECURING USER EQUIPMENT IDENTIFIER FOR USE EXTERNAL TO COMMUNICATION NETWORK

(71) Applicant: Nokia Technologies Oy, Espoo (FI)

(72) Inventors: Suresh Nair, Whippany, NJ (US); Laurent Thiebaut, Antony (FR); Omar Elloumi, Palaiseau (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/180,151

(22) Filed: Feb. 19, 2021

(65) Prior Publication Data

US 2022/0272530 A1  Aug. 25, 2022

(51) Int. Cl.
*H04W 12/06* (2021.01)
*H04L 9/08* (2006.01)
*H04L 9/32* (2006.01)
*H04W 12/03* (2021.01)

(52) U.S. Cl.
CPC ........... *H04W 12/06* (2013.01); *H04L 9/0894* (2013.01); *H04L 9/3236* (2013.01); *H04W 12/03* (2021.01); *H04L 2209/80* (2013.01)

(58) Field of Classification Search
CPC .... H04W 12/06; H04W 12/03; H04L 9/0894; H04L 9/3236; H04L 2209/80
See application file for complete search history.

(56) References Cited

U.S. PATENT DOCUMENTS

| 10,812,977 | B2 * | 10/2020 | Li ........................ H04W 12/06 |
| 2019/0053147 | A1 * | 2/2019 | Qiao .................... H04W 28/24 |
| 2020/0169877 | A1 * | 5/2020 | Kim ..................... H04W 12/069 |
| 2020/0236549 | A1 * | 7/2020 | Liu ....................... H04W 12/35 |
| 2020/0344603 | A1 * | 10/2020 | Gamishev ........... H04W 12/041 |
| 2021/0021993 | A1 * | 1/2021 | Yang ................. H04W 12/0433 |

(Continued)

FOREIGN PATENT DOCUMENTS

CN   112514422 A  *  3/2021  ............. H04W 4/06

(Continued)

OTHER PUBLICATIONS

Ericsson "UE id retrieval for the EEC", S6-210091, 3GPP TSG-SA WG6, Jan. 18-26, 2021 (Year: 2021).*

(Continued)

*Primary Examiner* — Alexander Lagor
*Assistant Examiner* — Lydia L Noel
(74) *Attorney, Agent, or Firm* — Robert P. Michal, Esq.; Carter, DeLuca & Farrell LLP

(57) ABSTRACT

Techniques for securing an identifier of user equipment for a request external to a communication network are disclosed. For example, a method comprises receiving, at a network entity, a request for identification information for user equipment from an entity external to a communication network to which the network entity belongs. The network entity generates a secure identifier for the user equipment, wherein the secure identifier comprises an encrypted form of a public subscription identifier associated with the user equipment. The network entity sends the secure identifier to the external entity. The network entity receives the secure identifier in a subsequent request from the external entity. The network entity utilizes the received secure identifier to confirm the received secure identifier corresponds to the user equipment.

5 Claims, 5 Drawing Sheets

(56) References Cited

U.S. PATENT DOCUMENTS

| | | | | |
|---|---|---|---|---|
| 2021/0289351 A1* | 9/2021 | Ferdi | ..................... | H04W 12/75 |
| 2021/0392495 A1* | 12/2021 | Tsiatsis | ................. | H04L 67/141 |
| 2023/0245085 A1* | 8/2023 | Ene | ........................ | G06Q 20/42 |
| | | | | 705/44 |

OTHER PUBLICATIONS

3GPP, "3rd Generation Partnership Project; Technical Specification Group Services and System Aspects; System Architecture for the 5G System (5GS); Stage 2 (Release 16)," 3GPP TS 23.501 V16.5.0, Jul. 2020, 441 pages.

3GPP, "3rd Generation Partnership Project; Technical Specification Group Services and System Aspects; Security Architecture and Procedures for 5G System (Release 16)," 3GPP TS 33.501 V16.3.0, Jul. 2020, 248 pages.

3GPP, "3rd Generation Partnership Project; Technical Specification Group Core Network and Terminals; Numbering, addressing and identification (Release 17)," 3GPP TS 23.003 V17.0.0, Dec. 2020, 142 pages.

3GPP, "3rd Generation Partnership Project; Technical Specification Group Services and System Aspects; Study on Security Aspects of Enhancement of Support for Edge Computing in 5GC (Release 17)," 3GPP TR 33.839 V0.4.0, Jan. 2021, 56 pages.

3GPP, "3rd Generation Partnership Project; Technical Specification Group Services and System Aspects; Architecture for enabling Edge Applications; (Release 17)," 3GPP TS 23.558 V1.3.0, Jan. 2021, 134 pages.

* cited by examiner

SECURING USER EQUIPMENT IDENTIFIER FOR USE EXTERNAL TO COMMUNICATION NETWORK

FIELD

The field relates generally to communication systems, and more particularly, but not exclusively, to security management of user equipment identifiers.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," the disclosure of which is incorporated by reference herein in its entirety. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with user equipment identifiers can present a significant challenge.

SUMMARY

Illustrative embodiments provide techniques for securing an identifier of user equipment for a request external to a communication network.

For example, in one illustrative embodiment, a method comprises receiving, at a network entity, a request for identification information for user equipment from an entity external to a communication network to which the network entity belongs. The network entity generates a secure identifier for the user equipment, wherein the secure identifier comprises an encrypted form of a public subscription identifier associated with the user equipment. The network entity sends the secure identifier to the external entity. The network entity receives the secure identifier in a subsequent request from the external entity. The network entity utilizes the received secure identifier to confirm the received secure identifier corresponds to the user equipment.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. For example, 3GPP TR 33.839 entitled "Technical Specification Group Services and System Aspects; Study on Security Aspects of Enhancement of Support for Edge Computing in 5GC," and TS 23.003 entitled "Technical Specification Group Core Network and Terminals; Numbering, Addressing and Identification," the disclosures of which are incorporated by reference herein in their entireties, may also be mentioned below in the context of some illustrative embodiments.

However, while well-suited for 5G-related 3GPP standards, embodiments are not necessarily intended to be limited to any particular standards.

Illustrative embodiments are related to securing an identifier of user equipment for a request external to a communication network, e.g., a 5G network. Prior to describing such illustrative embodiments, a general description of main components of a 5G network will be described below in the context of FIGS. 1 and 2.

Figure 1:
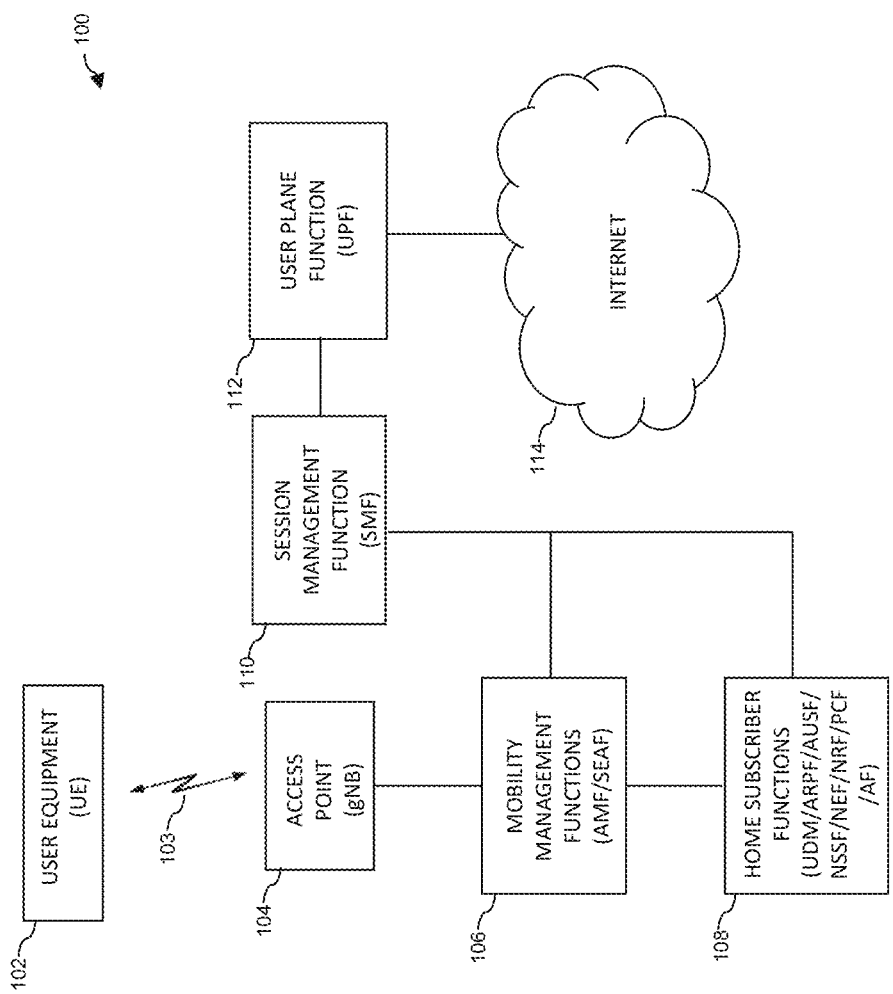
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network such as an N3IWF (Non-3GPP Interworking Function), a TNGF (Trusted Non-3GPP Gateway Function) or a W-AGF (Wireline Access Gateway Function) or may correspond to a legacy access point (e.g., eNB).

The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity or authentication entities. Further, an Authentication Credential Repository and Processing Function (ARPF) can be utilized in conjunction with the UDM. In addition, home subscriber functions may also include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) in which some or all of the home subscriber functions 108 reside. The HPLMN is also referred to as the Home Environment (HE). If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network. Furthermore, one or more of subscriber functions 108 can be part of a VPLMN if appropriate in certain circumstances. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. It is to be appreciated that network 114 in FIG. 1 may additionally or alternatively represent other network infrastructures including, but not limited to, cloud computing infrastructure and/or Edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
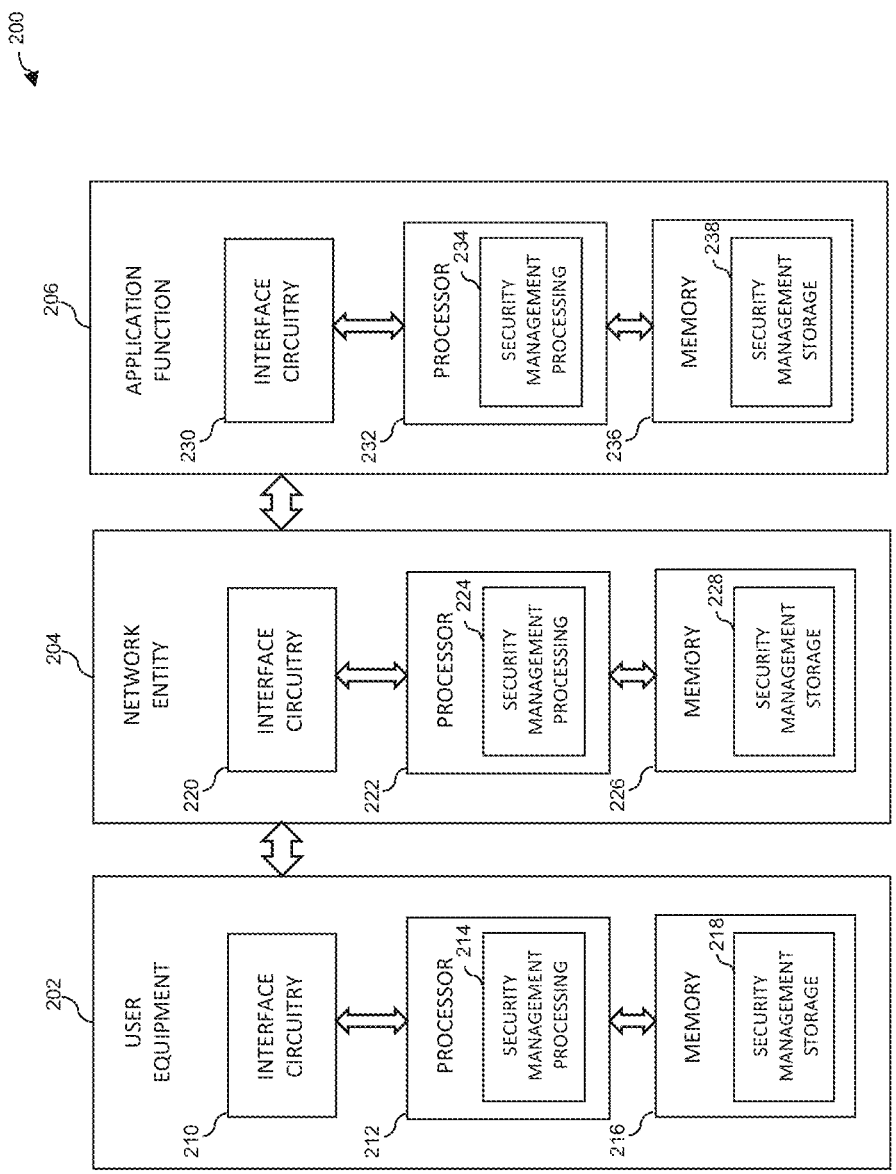
FIG. 2 illustrates user equipment and at least one network entity with which one or more illustrative embodiments may be implemented.

FIG. 2 is a block diagram illustrating computing architectures for various participants in methodologies according to illustrative embodiments. More particularly, system 200 is shown comprising user equipment (UE) 202, a network entity 204, and an application function 206. For example, in illustrative embodiments and with reference back to FIG. 1, UE 202 can represent UE 102, network entity 204 can represent one or more of functions 106 and 108 (e.g., NEF). Application function 206, as will be further explained below, can be a function external to the 5G core network, e.g., a third-party application server. It is to be appreciated that the UE 202, network entity 204, and application function 206 are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

The network entity 204 comprises a processor 222 coupled to a memory 226 and interface circuitry 220. The processor 222 of network entity 204 includes a security management processing module 224 that may be implemented at least in part in the form of software executed by the processor 222. The processing module 224 performs security management operations described in conjunction with subsequent figures and otherwise herein. The memory 226 of network entity 204 includes a security management storage module 228 that stores data generated or otherwise used during security management operations.

The application function 206 comprises a processor 232 coupled to a memory 236 and interface circuitry 230. The processor 232 of application function 206 includes a security management processing module 234 that may be implemented at least in part in the form of software executed by the processor 232. The processing module 234 performs security management operations described in conjunction with subsequent figures and otherwise herein. The memory 236 of application function 206 includes a security management storage module 238 that stores data generated or otherwise used during security management operations.

The processors 212, 222, and 232 may comprise, for example, microprocessors such as central processing units (CPUs), application-specific integrated circuits (ASICs), digital signal processors (DSPs) or other types of processing devices, as well as portions or combinations of such elements.

The memories 216, 226, and 236 may be used to store one or more software programs that are executed by the respective processors 212, 222, and 232 to implement at least a portion of the functionality described herein. For example, security management operations and other functionality as described in conjunction with subsequent figures and otherwise herein may be implemented in a straightforward manner using software code executed by processors 212, 222, and 232.

A given one of the memories 216, 226, or 236 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216, 226, and 236 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210, 220, and 230 illustratively comprise transceivers or other communication hardware or firmware that allows the associated system elements to communicate with one another in the manner described herein.

It is apparent from FIG. 2 that user equipment 202, network entity 204, and application function 206 are configured for communication with each other as security management participants via their respective interface circuitries 210, 220, and 230. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, security management messages, registration request/response messages and data, request/response messages, authentication request/response messages and data, control data, audio, video, multimedia, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

Still further, while FIG. 2 illustrates example architectures and interconnectivity between user equipment and a network entity, FIG. 2 can also represent example architectures and interconnectivity between multiple network entities (e.g., 202 can represent one network entity operatively coupled to another network entity in the form of network entity 204). More generally, FIG. 2 can be considered to represent processing devices configured to provide respective security management functionalities and operatively coupled to one another in a communication system.

Figure 3:
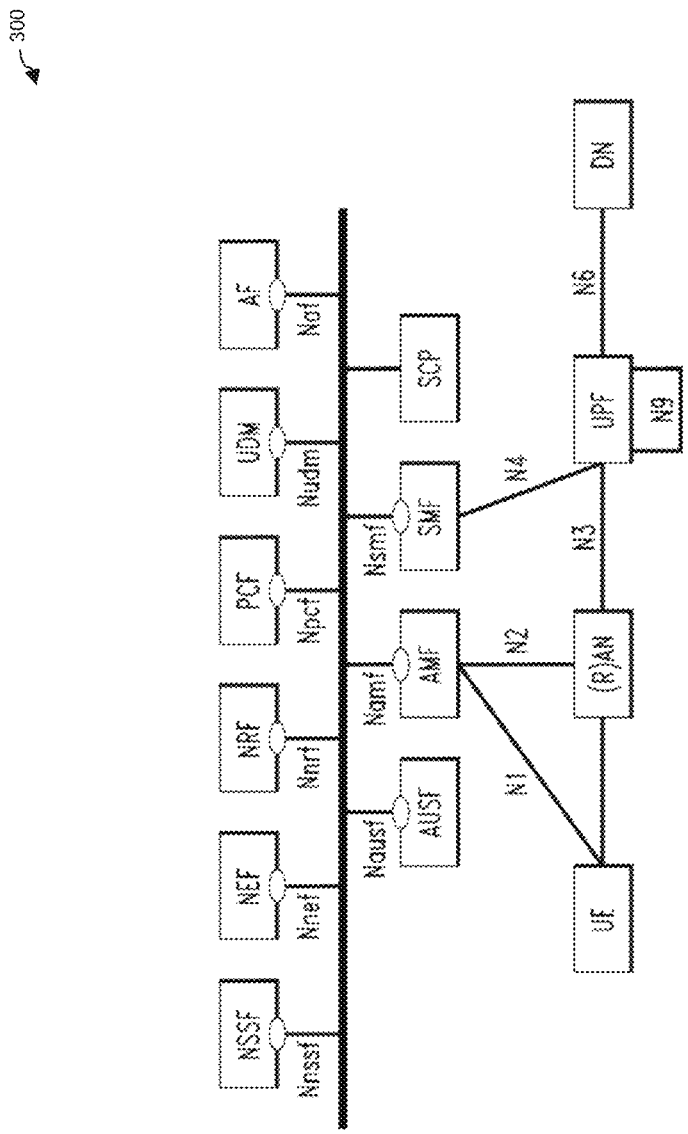
FIG. 3 illustrates a service-based architecture for a communication system within which one or more illustrative embodiments may be implemented.

As mentioned above, the 3GPP TS 23.501 defines the 5G system architecture as service-based, e.g., Service-Based Architecture (SBA). FIG. 3 illustrates a general 5G SBA implementation 300 as further described in 3GPP TS 23.501. Note that the network entities (elements/functions) in FIG. 3 are the same or similar to those described above in the context of FIGS. 1 and 2. The notation of a capital "N" in front of the network entity name (e.g., Nnef) denotes the SBA-based interface within the core network used to access the particular network entity (e.g., NEF).

It is realized herein that in deploying different NFs, as depicted in FIG. 3, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces). By way of example only, and as will be further explained herein, NEF may need to interact with an application function residing, at least in part, on a server managed by a third-party enterprise ("third-party" here illustratively refers to a party other than the network operator of the SBA-based 5G core network). Using 5G approaches, this results in NEF supporting multiple services both internally and externally at the same time. Internally, NEF may provide services to other internal functions as well as multiple UEs, while at the same time interacting with an external server (e.g., an application function) which may be owned and operated by a third-party entity. More generally, in a 5G core network, each NF provides a defined set of services (acting as service producers) to other NFs (service consumers). Each NF can be a service producer for one service and service consumer for another service. An application server may be considered as an example of an external function, whether or not it is managed by a third party.

Assume that a UE (e.g., UE 202 in FIG. 2) is seeking to access an application function (e.g., application function 206 in FIG. 2) on a server external to a communication network (e.g., including network entity 204 in FIG. 2) with which the UE has a subscription. The application function and/or server may be more generally referred to as an external entity. In some examples, the application function can be implemented as part of an Edge application server, an Edge entitlement server (see, e.g., the above-referenced TR 33.839 and/or other Edge computing 3GPP standards), and/or some other external entity operating on behalf of the application function. It is realized herein in accordance with illustrative embodiments that a unique identifier for the UE should be utilized for identification purposes. One example of such an identifier is a Generic Public Subscription Identifier (GPSI). A GPSI may be used for addressing a 3GPP subscription in different data networks outside of the 3GPP system. The 3GPP system can store within the subscription data, for the particular UE, the association between the GPSI and the corresponding SUPI of the UE. GPSIs are public identifiers that can be used both inside and outside of the 3GPP system. For example, the GPSI can be a Mobile Subscriber Integrated Services Digital Network (MSISDN) number or an External Identifier (which identifies a subscription associated to an IMSI), as described in the above-referenced 3GPP TS 23.003. If the MSISDN is included in the subscription data, it is possible that the same MSISDN value is supported in both 5GS and EPS (LTE). Further, it is to be noted that there is no implied 1-to-1 relationship between the GPSI and the SUPI.

Illustrative embodiments further realize that if the UE network-assigned identifier GPSI is exposed to servers outside of the 3GPP network, there is a security and privacy risk that the user (UE) becomes trackable by malicious actors. Accordingly, illustrative embodiments provide for the GPSI (more generally, a public subscription identifier) to be translated in to a temporary UE identifier (more generally, as secure identifier). More particularly, illustrative embodiments provide for hiding (e.g., encrypting, ciphering, encoding, etc.) the GPSI so as not to expose it to third-party application servers (more generally, external entities). For example, in one or more illustrative embodiments, the GPSI is converted to a temporary UE identifier which, in some embodiments, is specific to a particular application server/ function identifier and assigned a validity duration. A random number can also be utilized when generating the temporary UE identifier.

To convert GPSI into temporary UE identifier, illustrative embodiments generate an encrypted (ciphered) GPSI by encrypting a hashed form of GPSI with a cryptographic key identified by a key identifier. For example, GPSI can be hashed or otherwise scrambled by an application function identifier (AF ID) and a validity time value and, in some embodiments, RAND (i.e., random number). The hashed GPSI value is then encrypted using the cryptographic key to form the temporary UE identifier. After the validity duration expires, and for any other application servers, the temporary identifier is invalid. In one or more illustrative embodiments, the NEF of the core network with which the UE has a subscription generates the temporary UE identifier. In some embodiments, the NEF generates the temporary UE identifier the first time the application function inquires about the UE registers and the application function requests UE identification from the NEF. Then, in subsequent interactions for this specific UE, the application function presents the temporary UE value assigned by the NEF for usage by the NEF to determine (confirm) which UE is the target of the subsequent request from the application function. Two illustrative embodiments are explained below in the context of FIGS. 4 and 5, respectively.

Figure 4:
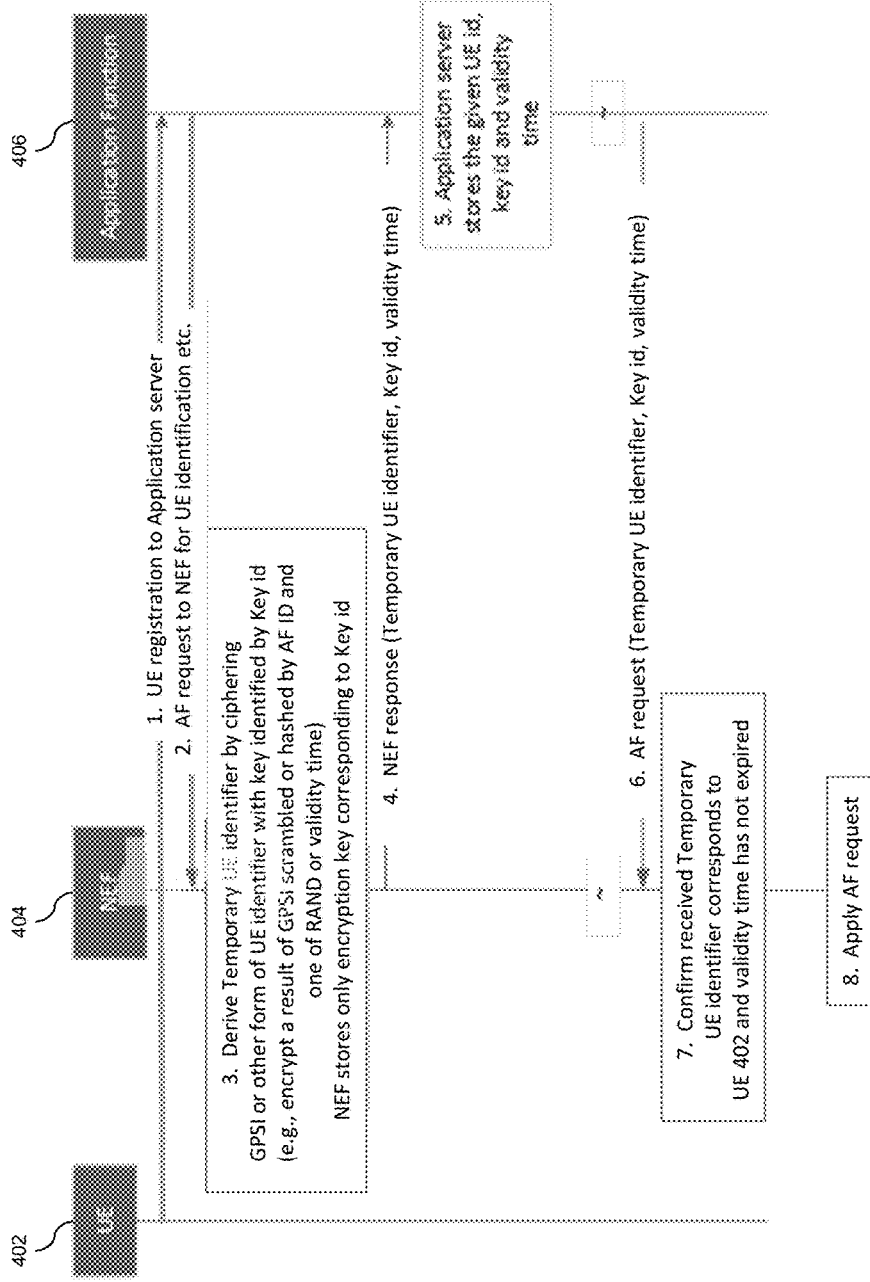
FIG. 4 illustrates a methodology for securing an identifier of user equipment for a request external to a communication network, according to one illustrative embodiment.

FIG. 4 illustrates a methodology 400 for generating and utilizing a secure identifier for a request external to a communication network, according to one illustrative embodiment. More particularly, FIG. 4 shows UE 402, NEF 404 and application function 406. It is understood that, in this illustrative embodiment, application function 406 is hosted by an application server (thus, the terms application function and application server may be used interchangeably herein and understood to more generally be examples of one or more external entities). In this embodiment, NEF 404 is effectively stateless, i.e., NEF 404 does not need to store a context per UE and per application. That is, NEF 404 stores only the key identifier (key id) and the corresponding key and security mechanisms denoted by the key identifier. The NEF 404 may store multiple instances of the key identifier (key id) and of the corresponding key and security mechanisms denoted by the key identifier in order for the NEF 404 to be able to change the keys it is using to protect the temporary UE identifier (allowing a change of keying material when the previous key may have been used too much or may have been compromised). No UE-specific details are stored at NEF 404. The UE-specific details are given to application server at initial registration time, and application function 406 hosted on the application server then presents the UE-specific details to NEF 404 for validation. NEF 404 decrypts the encrypted temporary UE identifier using the key pointed to by the key identifier received from application function 406. As mentioned, NEF 404 can choose to make the security operation specific to the application server/function by using the application function/server identifier as one of the encryption operation inputs.

Referring now to the numbered steps in methodology 400 of FIG. 4:

Step 1. UE 404 registers (UE registration) with the application function 406 (application server).

Step 2. Application function 406 queries NEF 404 for UE identification.

Step 3. NEF 404 derives (generates) a temporary UE identifier. For example, in one illustrative embodiment, NEF 404 generates the temporary UE identifier by encrypting a hashed form of GPSI with a cryptographic key identified by a key identifier. For example, GPSI can be hashed or otherwise scrambled by an application function identifier (AF ID) and a validity time value and, in some embodiments, RAND. The hashed GPSI value is then encrypted using the cryptographic key to form the temporary UE identifier. NEF 404 stores only the cryptographic (encryption) key corresponding to the key identifier.

Step 4. NEF 404 sends a query response to application function 406 which comprises the temporary UE identifier, the key identifier, and the validity time.

Step 5. Application function 406 stores the temporary UE identifier, the key identifier, and the validity time received from NEF 404.

Step 6. Subsequently (after the initial contact), application function 406 sends a new request to NEF 404. In this new request message, application function 406 includes the temporary UE identifier, the key identifier, and the validity time (which it received from NEF 404 in step 4 and stored in step 5).

Step 7. NEF 404 takes the key identifier received in step 6 from application function 406, retrieves the cryptographic key it used to create the temporary UE identifier, and decrypts the temporary UE identifier to obtain GPSI, thereby confirming that the received temporary UE identifier corresponds to UE 402. NEF 404 also checks to confirm that the validity time duration has not yet expired. The application function request can be to obtain information on the UE (UE 402) identified by the UE temporary identifier or to set (configure) information about the UE (UE 402) identified by the UE temporary identifier.

Step 8. If valid (validity duration has not elapsed), NEF 404 applies the application function request which can be to get information on the UE identified by the UE temporary identifier or to set (configure) information about the UE identified by the UE temporary identifier.

Note that in embodiments where the RAND is used in the temporary UE identifier computation, RAND is also exchanged between NEF 404 and application function 406 in steps of methodology 400.

Figure 5:
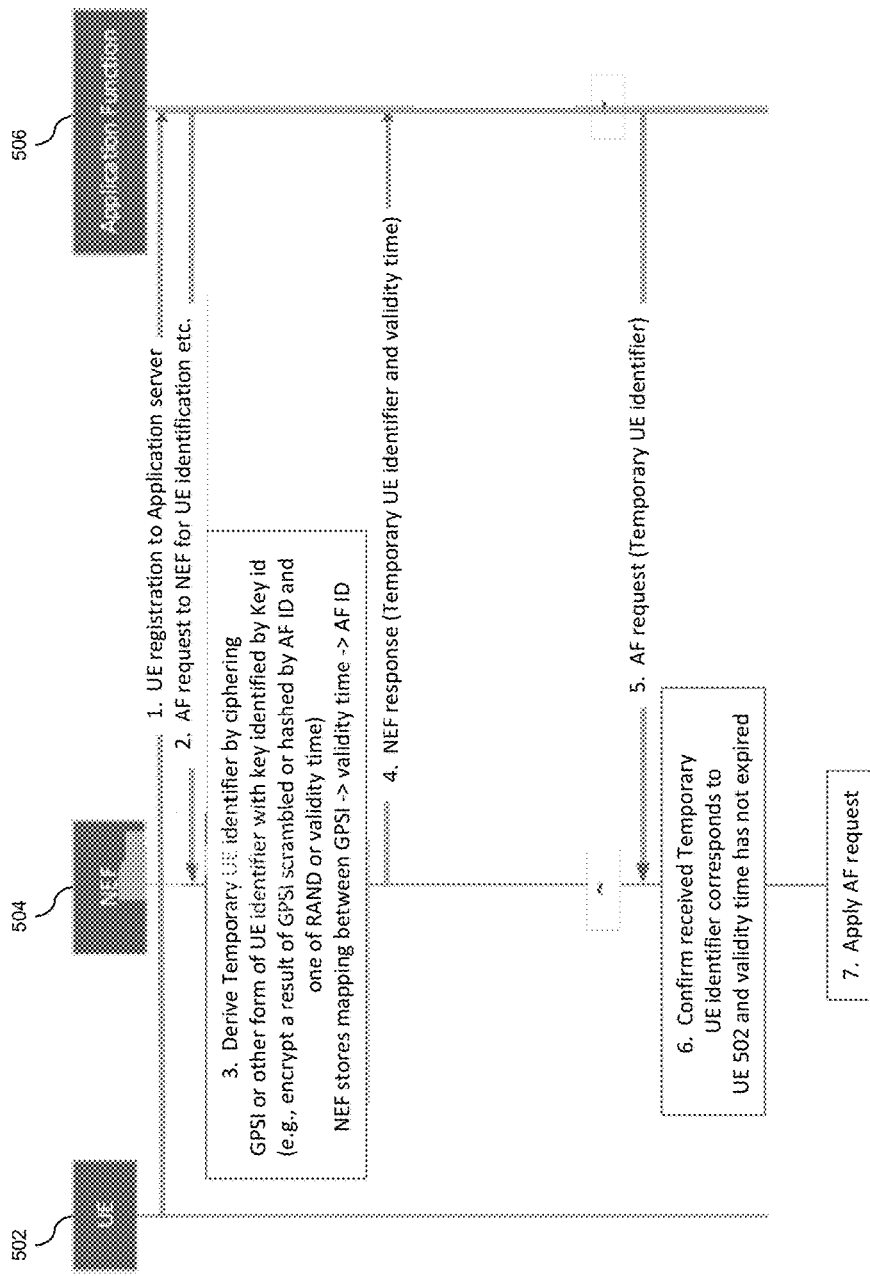
FIG. 5 illustrates a methodology for securing an identifier of user equipment for a request external to a communication network, according to another illustrative embodiment.

FIG. 5 illustrates a methodology 500 for generating and utilizing a secure identifier for a request external to a communication network, according to one illustrative embodiment. More particularly, FIG. 5 shows UE 502, NEF 504 and application function 506. It is understood that, in this illustrative embodiment, application function 506 is hosted by an application server (again, the terms application function and application server may be used interchangeably herein and understood to more generally be examples of one or more external entities). NEF 504 is effectively stateful in this embodiment i.e., NEF 504 stores a context per UE and per application. Similar to NEF 404 in methodology 400, NEF 504 encrypts the GPSI and creates a temporary UE identifier, using a key identifier, validity time and, in some embodiments, a random number (e.g., RAND). Note that NEF 504 may use more than one key identifier at a time, as explained above in the context of FIG. 4. NEF 504 sends the application function 506 only the created temporary UE identifier and validity time at the time of initial registration (as compared to methodology 400 where the key identifier, validity time, and RAND when used, are also sent). In subsequent interactions, the application function 506 presents only the temporary UE identifier within the validity time duration.

Referring now to the numbered steps in methodology 500 of FIG. 5:

Step 1. UE 504 registers (UE registration) with the application function 506 (application server).

Step 2. Application function 506 queries NEF 504 for UE identification.

Step 3. NEF 504 derives (generates) a temporary UE identifier. For example, in one illustrative embodiment, NEF 504 generates the temporary UE identifier by encrypting a hashed form of GPSI with a cryptographic key identified by a key identifier. For example, GPSI can be hashed or otherwise scrambled by an application function identifier (AF ID) and a validity time value and, in some embodiments, RAND. The hashed GPSI value is then encrypted using the cryptographic key to form the temporary UE identifier. As compared to methodology 400 wherein NEF 404 stores only the cryptographic (encryption) key corresponding to the key identifier, in methodology 500, NEF 504 stores a mapping for the temporary UE identifier with the values: GPSI→validity time→AF ID.

Step 4. NEF 504 sends a query response to application function 506 which comprises the temporary UE identifier and the validity time.

Step 5. Subsequently (after the initial contact), application function 506 sends a new request to NEF 504. In this new request message, application function 506 includes the temporary UE identifier (which it received from NEF 504 in step 4).

Step 6. NEF 504 takes the temporary UE identifier received in step 5 from application function 506, decrypts the temporary UE identifier to obtain GPSI and consults the mapping, thereby confirming that the received temporary UE identifier corresponds to UE 502. NEF 504 also consults the mapping to confirm that the validity time duration has not yet expired. The application function request can be to get information on the UE (UE 502) identified by the UE temporary identifier or to set (configure) information about the UE (UE 502) identified by the UE temporary identifier.

Step 7. If valid (validity duration has not elapsed), NEF 504 applies the application function request which can be to obtain information on the UE identified by the UE temporary identifier or to set (configure) information about the UE identified by the UE temporary identifier.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor; and
   at least one memory storing instructions that, when executed by the at least one processor, cause the apparatus at least to:
   receive, at a network entity of a core network of a communication system with which user equipment has a subscription, a request for identification information for the user equipment from an entity external to the communication system, the external entity comprising an application function outside the communication system, the application function being managed by a third party different than a network operator of the communication system with which the user equipment has the subscription;
   generate, at the network entity of the core network of the communication system, a secure identifier for the user equipment, wherein the secure identifier comprises an encrypted form of a public subscription identifier associated with the user equipment, the public subscription identifier being distinct from a corresponding subscription permanent identifier of the user equipment, wherein the encrypted form of the public subscription identifier associated with the user equipment is generated based at least in part on an identifier of the external entity, wherein the public subscription identifier comprises an external identifier that identifies a subscription associated to an International Mobile Subscriber Identity (IMSI), wherein the IMSI is a fixed 15-digit length and consists of a 3-digit Mobile Country Code (MCC), a 3-digit Mobile Network Code (MNC), and a 9-digit Mobile Station Identification Number (MSIN),
   wherein generating the secure identifier for the user equipment further comprises:
     generating a hash value by hashing the public subscription identifier with the identifier of the external entity and one or more of a time duration for which the secure identifier remains valid and a random number; and encrypting the hash value with a cryptographic key corresponding to a key identifier;
   send, from the network entity of the core network of the communication system, the secure identifier to the external entity;
   receive, at the network entity of the core network of the communication system, the secure identifier in a subsequent request from the external entity; and
   utilize, at the network entity of the core network of the communication system, the received secure identifier to confirm the received secure identifier corresponds to the user equipment,
   wherein the apparatus sends the key identifier and time duration along with the secure identifier to the external entity,
   wherein the apparatus receives the key identifier and time duration along with the secure identifier from the external entity together with the subsequent request,
   wherein the apparatus utilizes the key identifier and time duration along with the secure identifier to confirm the received secure identifier corresponds to the user equipment,
   wherein the network entity of the core network of the communication system operates in:
   a stateless manner by storing the cryptographic key corresponding to the key identifier; or a stateful manner by storing a mapping for the secure identifier comprising an association between the public subscription identifier, the identifier of the external entity, and the time duration, and wherein the network entity of the core network of the communication system comprises a network exposure function, and wherein, in response to storing the mapping, the apparatus sends the secure identifier to the external entity, receives the secure identifier from the external entity in accordance with the subsequent request, and utilizes the received secure identifier to consult the mapping to confirm the received secure identifier corresponds to the user equipment.

2. The apparatus of claim 1, wherein the communication system comprises a 5G communication system, and wherein the public subscription identifier comprises a Generic Public Subscription Identifier (GPSI).

3. The apparatus of claim 1 wherein the communication network comprises a 5G core network, and wherein the application function resides on a server which is part of an edge computing network external to the 5G core network.

4. A method comprising:

receiving, at a network entity of a core network of a communication system with which user equipment has a subscription, a request for identification information for the user equipment from an entity external to the communication system, the external entity comprising an application function outside the communication system, the application function being managed by a third party different than a network operator of the communication system with which the user equipment has the subscription;

generating, at the network entity of the core network of the communication system, a secure identifier for the user equipment, wherein the secure identifier comprises an encrypted form of a public subscription identifier associated with the user equipment, the public subscription identifier being distinct from a corresponding subscription permanent identifier of the user equipment, wherein the encrypted form of the public subscription identifier associated with the user equipment is generated based at least in part on an identifier of the external entity wherein the public subscription identifier comprises an external identifier that identifies a subscription associated to an International Mobile Subscriber Identity (IMSI), wherein the IMSI is a fixed 15-digit length and consists of a 3-digit Mobile Country Code (MCC), a 3-digit Mobile Network Code (MNC), and a 9-digit Mobile Station Identification Number (MSIN), wherein generating the secure identifier for the user equipment further comprises:

generating a hash value by hashing the public subscription identifier with the identifier of the external entity and one or more of a time duration for which the secure identifier remains valid and a random number; and encrypting the hash value with a cryptographic key corresponding to a key identifier;

sending, from the network entity of the core network of the communication system, the secure identifier to the external entity;

receiving, at the network entity of the core network of the communication system, the secure identifier in a subsequent request from the external entity; and utilizing, at the network entity of the core network of the communication system, the received secure identifier to confirm the received secure identifier corresponds to the user equipment, wherein the user equipment sends the key identifier and time duration along with the secure identifier to the external entity, wherein the user equipment receives the key identifier and time duration along with the secure identifier from the external entity together with the subsequent request, wherein the user equipment utilizes the key identifier and time duration along with the secure identifier to confirm the received secure identifier corresponds to the user equipment, wherein the network entity of the core network of the communication system operates in:

a stateless manner by storing the cryptographic key corresponding to the key identifier; or a stateful manner by storing a mapping for the secure identifier comprising an association between the public subscription identifier, the identifier of the external entity, and the time duration, and wherein the network entity of the core network of the communication system comprises a network exposure function, and wherein, in response to storing the mapping, the user equipment sends the secure identifier to the external entity, receives the secure identifier from the external entity in accordance with the subsequent request, and utilizes the received secure identifier to consult the mapping to confirm the received secure identifier corresponds to the user equipment.

5. An article of manufacture comprising a non-transitory computer-readable storage medium having embodied therein executable program code that when executed by a processor causes the processor to perform the steps of:

receiving, at a network entity of a core network of a communication system with which user equipment has a subscription, a request for identification information for the user equipment from an entity external to the communication system, the external entity comprising an application function outside the communication system, the application function being managed by a third party different than a network operator of the communication system with which the user equipment has the subscription;

generating, at the network entity of the core network of the communication system, a secure identifier for the user equipment, wherein the secure identifier comprises an encrypted form of a public subscription identifier associated with the user equipment, the public subscription identifier being distinct from a corresponding subscription permanent identifier of the user equipment, wherein the encrypted form of the public subscription identifier associated with the user equipment is generated based at least in part on an identifier of the external entity wherein the public subscription identifier comprises an external identifier that identifies a subscription associated to an International Mobile Subscriber Identity (IMSI), wherein the IMSI is a fixed 15-digit length and consists of a 3-digit Mobile Country Code (MCC), a 3-digit Mobile Network Code (MNC), and a 9-digit Mobile Station Identification Number (MSIN), wherein generating the secure identifier for the user equipment further comprises:

generating a hash value by hashing the public subscription identifier with the identifier of the external entity and one or more of a time duration for which the secure identifier remains valid and a random number; and encrypting the hash value with a cryptographic key corresponding to a key identifier;

sending, from the network entity of the core network of the communication system, the secure identifier to the external entity;

receiving, at the network entity of the core network of the communication system, the secure identifier in a subsequent request from the external entity; and utilizing, at the network entity of the core network of the communication system, the received secure identifier to confirm the received secure identifier corresponds to the user equipment, wherein the user equipment sends the key identifier and time duration along with the secure identifier to the external entity, wherein the user equipment receives the key identifier and time duration along with the secure identifier from the external entity together with the subsequent request, wherein the user equipment utilizes the key identifier and time duration along with the secure identifier to confirm the received secure identifier corresponds to the user equipment, wherein the network entity of the core network of the communication system operates in:

a stateless manner by storing the cryptographic key corresponding to the key identifier, or a stateful manner by storing a mapping for the secure identifier comprising an association between the public subscription identifier, the identifier of the external entity, and the time duration, and wherein the network entity of the core network of the communication system comprises a network exposure function, and wherein, in response to storing the mapping, the user equipment sends the secure identifier to the external entity, receives the secure identifier from the external entity in accordance with the subsequent request, and utilizes the received secure identifier to consult the mapping to confirm the received secure identifier corresponds to the user equipment.

\* \* \* \* \*